United States Patent
Geislinger et al.

(10) Patent No.: US 9,758,962 B2
(45) Date of Patent: Sep. 12, 2017

(54) DEVICE FOR ABSORBING STRUCTURE-BORNE SOUND

(71) Applicant: Ellergon Antriebstechnik Gesellschaft m.b.H., Hallwang (AT)

(72) Inventors: Matthias Geislinger, Hallwang (AT); Cornelius Geislinger, Hallwang (AT); Lothar Kurtze, Hallwang (AT)

(73) Assignee: Ellergon Antriebstechnik Gesellschaft m.b.H., Hallwang (AT)

( * ) Notice: Subject to any disclaimer, the term of this patent is extended or adjusted under 35 U.S.C. 154(b) by 0 days.

(21) Appl. No.: 14/868,807

(22) Filed: Sep. 29, 2015

(65) Prior Publication Data

US 2016/0090735 A1    Mar. 31, 2016

(30) Foreign Application Priority Data

Sep. 30, 2014  (EP) ..................... 14186989

(51) Int. Cl.
| | |
|---|---|
| *F16D 3/76* | (2006.01) |
| *E04B 1/84* | (2006.01) |
| *F16D 3/74* | (2006.01) |
| *F16D 1/076* | (2006.01) |

(52) U.S. Cl.
CPC ............. *E04B 1/84* (2013.01); *F16D 1/076* (2013.01); *F16D 3/74* (2013.01); *F16D 2300/22* (2013.01)

(58) Field of Classification Search
CPC ... F16D 3/74; F16D 3/76; F16D 1/076; F16D 2300/22
USPC ................................. 181/207, 209
See application file for complete search history.

(56) References Cited

U.S. PATENT DOCUMENTS

| | | | |
|---|---|---|---|
| 1,445,272 A | 2/1923 | Gill | |
| 3,024,628 A | 3/1962 | Yang | |
| 3,808,837 A * | 5/1974 | Anderson | ................. F16D 3/76 464/99 |

(Continued)

FOREIGN PATENT DOCUMENTS

| | | |
|---|---|---|
| DE | 1425263 A1 | 10/1968 |
| EP | 0534926 A2 | 3/1993 |

(Continued)

OTHER PUBLICATIONS

Translation of JP 05-196053; <https://www4.j-platpat.inpit.go.jp/cgi-bin/tran_web_cgi_ejje?u=http://www4.j-platpat.inpit.go.jp/eng/translation/20160914015948883445934300952143OE-F661D38E74A852360B0A5B32904C317>; accessed Sep. 13, 2016.*

(Continued)

*Primary Examiner* — Jeremy Luks
(74) *Attorney, Agent, or Firm* — Myers Wolin, LLC

(57) ABSTRACT

A device for absorbing structure-borne sound comprises at least one torque transmitting flange having two or more layers of materials of different damping capacity and stiffness stacked on each other. At least a portion of the flange has a radially jagged cross-sectional profile including two or more flanks consecutively arranged in radial direction and alternately inclined to the radial direction. The consecutive flanks merge into each other by forming corners, respectively. This structure-borne sound absorber reduces the propagation of vibrations at acoustically relevant frequencies via rotating machine parts. Combination with a compensation coupling results in a high-elasticity coupling preventing noise radiation.

18 Claims, 3 Drawing Sheets

(56) References Cited

U.S. PATENT DOCUMENTS

| | | | | |
|---|---|---|---|---|
| 4,164,877 | A | * | 8/1979 | Chivari .................... F16D 3/76 |
| | | | | 188/268 |
| 4,384,858 | A | * | 5/1983 | Kronert .................... F16D 3/74 |
| | | | | 464/56 |
| 4,385,025 | A | * | 5/1983 | Salerno ............... B29C 45/0062 |
| | | | | 264/255 |
| 4,929,115 | A | * | 5/1990 | Lunke ...................... F16D 3/74 |
| | | | | 403/220 |
| 6,669,569 | B2 | | 12/2003 | Geislinger |
| 7,677,980 | B2 | | 3/2010 | Geislinger et al. |
| 2001/0053717 | A1 | | 12/2001 | Geislinger |

FOREIGN PATENT DOCUMENTS

| | | |
|---|---|---|
| EP | 1394431 A2 | 3/2004 |
| JP | 62-075135 | 4/1987 |
| JP | 05-196053 | 8/1993 |
| JP | 2008-064305 | 3/2008 |

OTHER PUBLICATIONS

Extended European search report, dated Apr. 15, 2015, including the European search opinion issued for corresponding European Patent Application No. 14186989.1.
Office Action, dated Jun. 29, 2016, for Japanese Patent Application P2015-142874.

* cited by examiner

DEVICE FOR ABSORBING STRUCTURE-BORNE SOUND

CROSS REFERENCE TO RELATED APPLICATIONS

This application claims priority under 35 USC §119 to European Patent Application No. EP 14186989.1, filed on Sep. 30, 2014, the contents of which are incorporated herein by reference

FIELD OF THE INVENTION

The present invention relates to a device for absorbing structure-borne sound.

BACKGROUND

The operation of engines and corresponding drive lines is often impaired by unwanted vibrations at acoustically relevant frequencies. Materials like steel have small damping capacities allowing vibration energy to be transmitted through them with little attenuation. Specific engine and gearbox mounts may reduce the transmission of sound into a stationary support structure. However, sound may also propagate via rotating components in the drive line from the engine to a driven component such as a propeller of a ship.

Such drive lines may include compensation couplings for compensating axial and angular displacements between rotating parts of the drive line. An example of such a compensation coupling is known from U.S. Pat. No. 7,677,980 B2. This coupling has a corrugated membrane made of fiber-reinforced plastic which is axially flexible so as to deform during rotation. Such membranes and similar structures tend to radiate acoustic noise when being exited.

Another coupling showing multi-layered corrugated disks is known from U.S. Pat. No. 6,669,569 B2. The corrugated disks are smoothly curved in radial direction to provide a wavy profile in cross-section.

SUMMARY

The present invention aims at reducing the propagation of vibrations at acoustically relevant frequencies via rotating machine parts.

The invention provides a device for absorbing structure-borne sound, comprising a least one torque transmitting flange having two or more layers of materials of different damping capacity stacked on each other, wherein at least a portion of the flange has a radially jagged cross-sectional profile including two or more flanks consecutively arranged in radial direction and alternately inclined to the radial direction, and wherein consecutive flanks merge into each other by forming a corner, respectively.

The damping capacity represents the amount of mechanical energy that is converted to heat in a volume of material resulting in damping. A significant change in damping capacity implies an abrupt change in mechanical impedance at the boundaries between the layers. Due to the large difference in mechanical impedance a major part of vibration energy is reflected at the boundaries rather than being transmitted from one layer to the other.

Similarly, the corners in the jagged profile cause reflections of structure-borne sound waves within the flange and thus increase the desired transmission loss.

In addition, the jagged profile increases the length of a path the structure-borne sound waves have to pass through the flange in each phase of material, which further improves attenuation.

As a result, the propagation of structure-borne sound between rotating parts can be hampered without substantial influence on the torsional and axial stiffness.

Advantageous embodiments of the invention are indicated in further claims.

Preferably, consecutive flanks include an angle of 80° to 100° at a corner to improve internal reflections of structure-borne sound waves and to maintain high axial and radial stiffness.

Further, the flanks can be alternately inclined to the radial direction by positive and negative angles having an absolute value within a range of 60° to 120°.

According to another aspect of the invention the flanks differ in length such that integer of half-integer multiple length ratios are excluded for all possible pairs of flanks.

In particular, the flanks may differ in length such that for all possible pairs of flanks the length ratios are defined by different prime numbers.

This results in a flange having only weakly pronounced Eigen modes and avoids cross amplification of acoustic frequencies.

According to another aspect of the invention the flange includes two outer layers made of fiber-reinforced plastic (FRP) and an inner layer between the two outer layers and made of an elastomer, wherein the outer layers are separated by the inner layer. The outer layers do not contact each other but are isolated by elastomeric material. A sound wave progressing along the boundary between the fiber-reinforced plastic and the elastomer causes micro friction that dampens propagation of the sound wave. A structure-borne sound absorber of this type has a transmission loss comparable to that of an 8 to 10 times heavier rubber flange and thus provides a particularly light weight solution to the above-indicated technical problem. Moreover, the elastomeric layer provides an additional damping effect in all directions.

The thickness of the layers of fiber-reinforced plastic changes in radial direction from flank to flank, e.g. by reducing the number of fiber layers within the fiber-reinforced plastic. This causes further internal reflections of sound waves and thus increases the mechanical impedance in a desired manner.

In another preferred embodiment the thickness of the elastomeric layer increases in radial direction to maintain substantially the same shear and tensile stresses within the material over the whole radial extent.

According to another aspect of the invention the flanks between two corners are straight but may as well be slightly curved. The radius of curvature of the flanks is preferably larger than the outer radius of the flange.

According to another aspect of the invention the flange has an outer rim portion formed by one of its layers for connection with a first rotating part and an inner rim portion formed by another one of its layers for connection with a second rotating part. Thus, the device works as an acoustic absorber between said two rotating parts. Additional connecting means for securing the flange against the rotating parts, e.g. metal bolts or the like, may introduce further material boundaries for the attenuation of sound waves by reflection as well as by micro friction.

If required, two or more flanges can be arranged in series in axial direction.

According to another aspect of the invention there is provided a device for absorbing structure-borne sound, comprising: at least one torque transmitting flange having two or more layers of materials of different damping capacity and stiffness stacked on each other; wherein at least a portion of the flange has a radially jagged cross-sectional profile including two or more flanks consecutively arranged in radial direction and alternately inclined to the radial direction; and wherein consecutive flanks in said radially jagged cross-sectional profile merge into each other by forming corners, respectively, with pairs of consecutive flanks including an angle within a range of 80° to 100° at a corner; and wherein the flanks are alternately inclined to the radial direction by positive and negative angles having an absolute value within a range of 60° to 120°.

The above-described device for absorbing structure-borne sound may be employed between two rotating parts of any type for damping the propagation of vibrations at acoustically relevant frequencies via the rotating parts.

In particular, the device may constitute a member of a system further comprising at least one rotational component, wherein the flange of the device is connected to the rotational component by connecting means.

The rotational component is preferably selected from a group comprising couplings and torsional vibration dampers. Specifically, the couplings may include a compensation coupling for compensating axial and/or angular displacement of the axes of rotation of two rotating components.

BRIEF DESCRIPTION OF THE DRAWINGS

The invention will be described in greater detail hereinafter with reference to the accompanying drawings, in which.

DETAILED DESCRIPTION OF THE PREFERRED EMBODIMENTS

Figure 1:
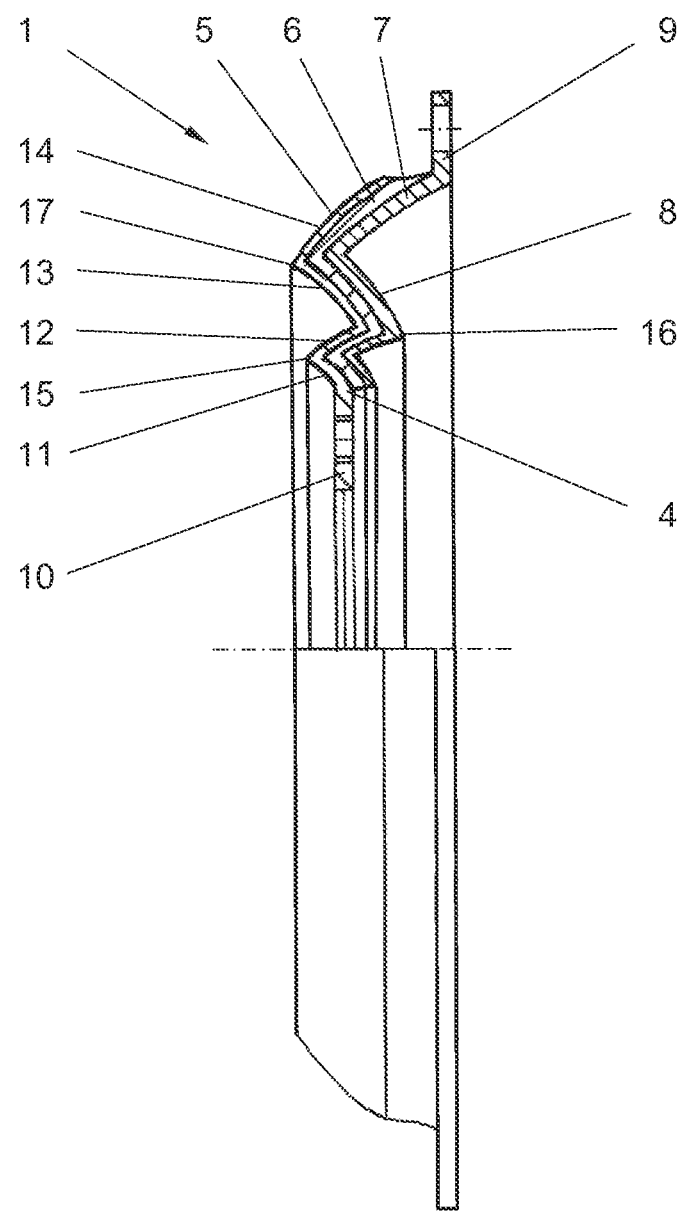
FIG. 1 is a semi cross sectional view of an embodiment of a device for absorbing structure-borne sound according to the present invention.
Figure 2:
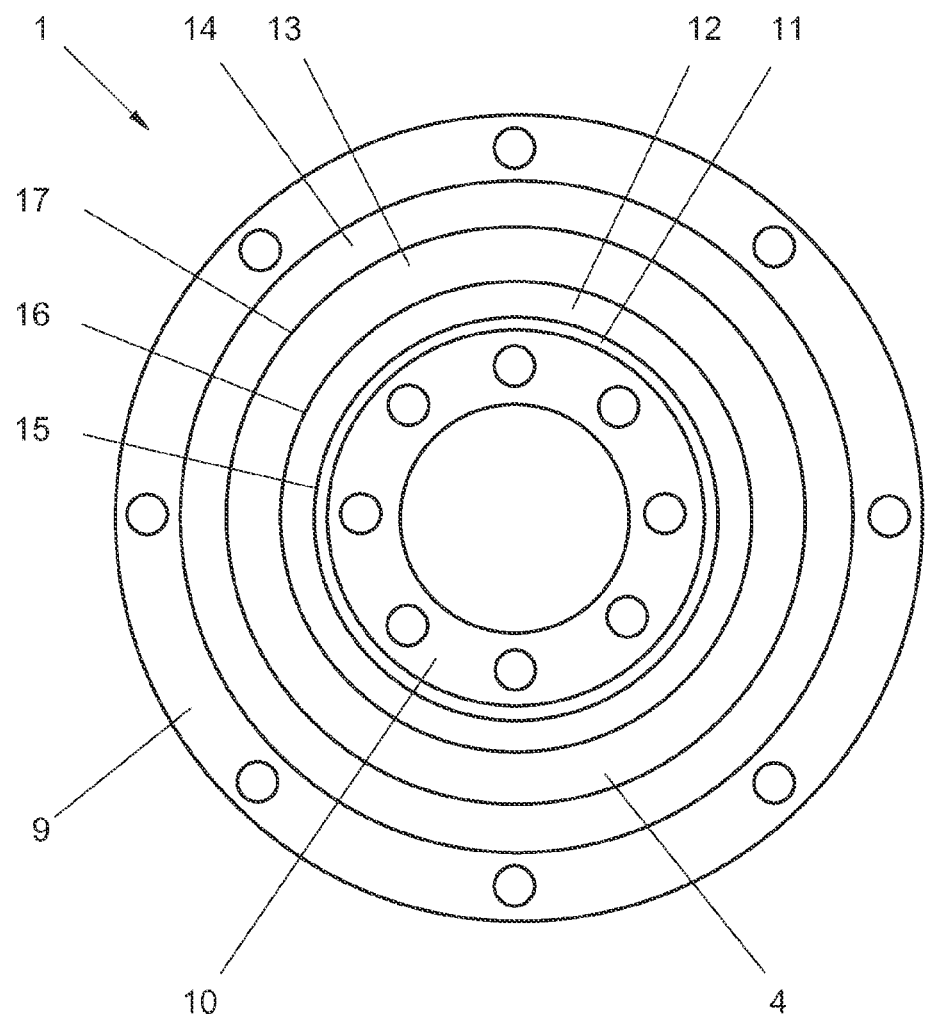
FIG. 2 is a front view of an embodiment of a device for absorbing structure-borne sound according to FIG. 1.

The embodiment in FIGS. 1 and 2 shows a device 1 for absorbing structure-borne sound e.g. in a drive line between an engine and a driven component. More specifically, the device 1 is configured to attenuate the propagation of vibrations within acoustically relevant frequencies, i.e. frequencies within a range of approximately 10 to 20,000 Hz.

Figure 3:
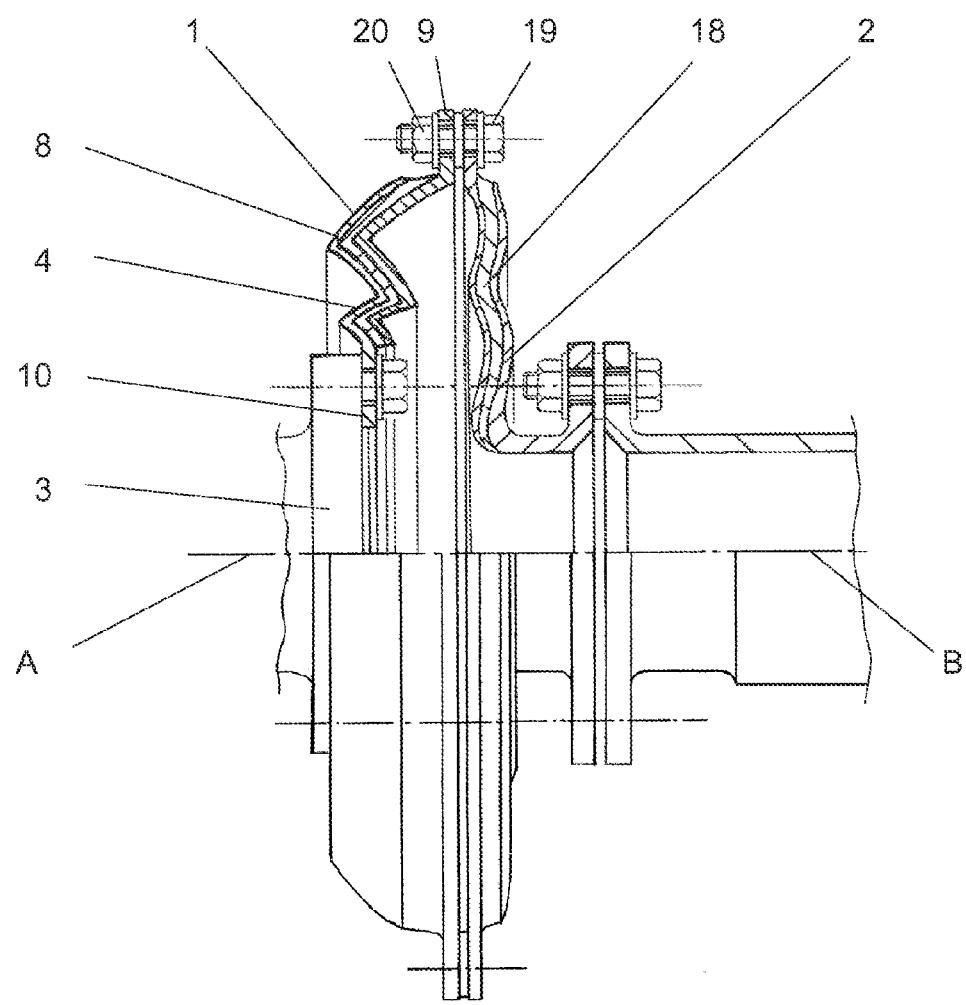
FIG. 3 is a schematic view of a drive line including a device for absorbing structure-borne sound according to the present invention.

The device 1 comprises a torque transmitting flange 4 for arrangement between two rotating parts 2 and 3. As shown in FIG. 3, the device 1 may drivingly connect a compensating coupling 2 with a drive shaft 3.

The device 1 for absorbing structure-borne sound comprises a flange 4 extending substantially in radial direction. The flange 4 has a multilayer structure and includes two or more layers 5 to 7 of materials of different damping capacity stacked on each other. The outer layers 5 and 7 are isolated by the inner layer 6 so that they do not contact each other but are entirely separate from each other.

FIG. 1 shows a three layer structure with two outer layers 5 and 7 made of a first material and an inner layer 6 made of a second material. The material of the inner layer 6 has a higher damping capacity and different stiffness than that of the outer layers 5 and 7, i.e. a greater ability of absorbing vibration by internal friction and converting the mechanical energy into heat.

In particular, the damping capacity of the material of the inner layer 6 is at least two times, preferably ten times larger than that of the material of the outer layers 5 and 7 to thereby cause a substantial change of the mechanical impedance at the boundaries between neighbouring layers.

Preferably, the outer layers 5 and 7 are made of fiber reinforced plastics (FRP) whereas the inner layer 6 is made of an elastomer bonded between the outer layers 5 and 7. However, other materials may be contemplated as well. E.g. the outer layers 5 and 7 may be formed as metal layers.

The flange 4 includes at least a portion 8 having a radially jagged cross-sectional profile, in other words is radially zigzagged or serrated, and further portions 9 and 10 for connection with the rotating parts. In the present case, the latter are formed by an outer rim portion 9 and an inner rim portion 10 with the radially jagged portion 8 connecting same. More specifically, the outer rim portion 9 is integrally formed by one of the outer layers 7 whereas the inner rim portion 10 is integrally formed by the other of said outer layers 5.

The radially jagged cross-sectional profile includes two or more flanks 11 to 14 consecutively arranged in radial direction and alternately inclined to the radial direction of the flange 4. FIG. 1 shows a saw-toothed structure with two teeth. Depending on the diameter of the flange 4 the number of teeth may be lower or higher.

Consecutive flanks 11 to 14 of the jagged profile merge into each other by forming a corner 15 to 17, respectively. Neighbouring flanks 11 to 14 include an angle of 80 to 100°, preferably 85° to 95° and further preferred of approximately 90° at a corner 15 to 17.

Further, the flanks 11 to 14 are alternately inclined to the radial direction by positive and negative angles having an absolute value within a range of 60° to 120°.

The multilayer structure extends over the whole radial extend of the portion 8 having a radially jagged cross-sectional profile so that the flanks 11 to 14 increase the length of the path a sound wave may travel though the same material. This increases internal damping by the material while the corners 15 to 17 cause internal reflections of the sound waves. Both effects reduce the propagation of acoustically relevant vibrations, i.e. increase transmission losses.

Moreover, the flanks 11 to 14 differ in length, wherein the length is defined as the distance between two corners for the flanks 12 and 13 or as the distance between one corner and the rim portion 9 or 10 for the flanks 11 and 14. Integer of half-integer multiple length ratios are excluded for all possible pairs of flanks. For example, for all possible pairs of flanks the length ratios are defined by different pairs of prime numbers. FIG. 1 shows, merely by example, a length ratio for the flanks 11, 12, 13 and 14 of 2:3:5:7, i.e. based on different prime numbers. Other ratios such as 3:5:7:11 are possible, too. In addition the order of prime numbers in the ratios can be varied, e.g. 2:5:3:7, so that not necessarily the innermost flank is the shortest and the outermost flank is the longest. Such ratios avoid pronounced Eigen modes and avoid amplification of sound waves within the material.

The flanks 11 to 14 of the radially jagged cross-sectional profile may be straight. Alternatively they may be slightly curved while the radius of curvature is preferably larger than the radius of the outer diameter of the flange 4.

Further, the flanks 11 to 14 of the outer layers 5 and 7 may differ in thickness so as to cause further reflections of sound waves. For example, in the outer layer 5 forming the inner rim portion 10 the thickness of the layer 5 may decrease radially outwardly from flank 11 to flank 14, whereas in the outer layer 7 forming the outer rim portion 9 the thickness of the layer 7 may decrease radially inwardly from flank 14 to flank 11. Such changes in thickness can be achieved by reducing the number fiber layers within the fiber reinforced plastic.

In addition, the thickness of the elastomeric inner layer 6 increases in radial direction so as to keep tensile and shear stress in the material substantially constant. Preferably, the maximum thickness of the rubber material is less than twice the maximum thickness of a layer of fiber reinforced plastic. One major purpose of the elastomeric inner layer 6 is isolating the outer layers 5 and 7 from each other. Though the elastomeric inner layer 6 may provide some axial damping because of its elasticity, damping of structure-borne sound is mainly achieved by internal reflections of the sound waves, in particular at the sharp change of mechanical impedance at the boundaries between the layers of different materials, the jagged profile and in particular the corners between the flanks as well as the narrowing thickness of consecutive flanges in combination with the particular design of the length of the flanks 11 to 14.

A thicker inner layer 6 of elastic material could improve damping properties but, since the elastomeric material is usually much heavier than the fiber reinforced material, leads to a heavy design. Moreover, acoustic absorbers made of rubber tend to heat up to temperatures at which rubber may begin to disintegrate because the mechanical vibration energy is converted into heat in the rubber.

As compared to a corrugated membrane 18 of a compensation coupling 2, the flange 4 of the device 1 for absorbing structure-borne sound is rather stiff in axial direction. It also exhibits a high radial and torsional stiffness and does not provide any substantial compensation of axial, radial or angular displacement between the axes of rotation A and B of the rotating parts 2 and 3.

When required, two or more flanges 4 can be arranged in series in axial direction. The flanges 4 may be connected directly or via axial spacers. Connections via metallic bolts introduce further boundaries between materials of different damping capacity for reflection of sound waves. In addition, micro friction at these connections may attenuate further the propagation of vibrations. Several flanges 4 in a series are alternately connected at their outer and inner rim portions 9 and 10. The shape of the outer rim portion 9 and the inner rim portion 10 may differ from that shown in FIG. 1.

The above-described device 1 for absorbing structure-borne sound can be used in combination with any type of rotating parts. FIG. 3 shows it as a component in a system further comprising at least one rotational component. The rotational component may be selected from a group comprising couplings and torsional vibration dampers. In particular, the components of the system may be dimensioned such as to form a modular system with pre-defined mechanical interfaces via the outer and inner rim portions 9 and 10. The device 1 for absorbing structure-borne sound is connected to the at least one rotational component by connecting means such as metallic bolts 19 and nuts 20.

FIG. 3 shows by example a compensation coupling 2 as a rotational component. The compensation coupling has an axially flexible corrugated membrane 18 for compensating axial and/or angular displacement of the axes of rotation A, B of two rotating parts so that the combination of both, the compensation coupling 2 and the structure-borne sound absorber as described above, results in a high-elastic coupling that prevents noise radiation. Though not shown in FIG. 3, both components may share a common member made of fiber reinforced plastic. E.g. the outer layer 7 of the acoustic absorber 1 facing the coupling 2 and the oppositely arranged layer of the membrane 18 may be formed in a single piece. However, the structure-borne sound absorber 1 as described above may as well be coupled with other types of couplings.

The invention has been described in detail on the basis of certain embodiment and modifications. In particular, it is possible to combine individual technical features that are described in conjunction with other technical features independent of the later with other individual technical features, even when not explicitly described, as long this is technically feasible. Thus, the invention is not limited to the described embodiment and its described modifications but rather encompasses all embodiments as defined by the claims.

What is claimed is:

1. A device for absorbing structure-borne sound, comprising:
   at least one torque transmitting flange having two or more layers of materials of different damping capacity and stiffness stacked on each other;
   wherein at least a portion of the flange has a radially jagged cross-sectional profile including two or more flanks consecutively arranged in radial direction and alternately inclined to the radial direction; and
   wherein consecutive flanks merge into each other by forming a corner, respectively, and wherein at said corners, pairs of consecutive flanks include an angle of 80° to 100°;
   wherein the structure borne sound attenuated comprises vibrations within acoustically relevant frequencies in the range of 10 to 20,000 Hz; and
   wherein the damping of such structure borne sound is by internal reflections of sound waves at a change of mechanical impedance at a boundary between the layers of materials, the jagged profile, and the corners.

2. The device of claim 1, wherein the flanks differ in length such that integer or half-integer multiple length ratios are excluded for all possible pairs of flanks.

3. The device of claim 1, wherein the flanks differ in length such that for all possible pairs of flanks the length ratios are defined by different prime numbers.

4. The device of claim 1, wherein the flange includes two outer layers made of fiber-reinforced plastic and an inner layer between the two outer layers and made of an elastomer, wherein the outer layers are isolated by the inner layer.

5. The device of claim 4, wherein the thickness of the layers of fiber-reinforced plastic changes in radial direction from flank to flank.

6. The device of claim 4, wherein the thickness of the elastomeric inner layer increases in radial direction.

7. The device of claim 1, wherein the flanks are straight or slightly curved.

8. The device of claim 1, wherein the flange has an outer rim portion formed by one of its layers for connection with a first rotational part and an inner rim portion formed by another one of its layers for connection with a second rotational part.

9. The device of claim 8, wherein two or more flanges are arranged in series in axial direction.

10. A device for absorbing structure-borne sound, comprising:
   at least one torque transmitting flange having two or more layers of materials of different damping capacity and stiffness stacked on each other;

wherein at least a portion of the flange has a radially jagged cross-sectional profile including two or more flanks consecutively arranged in radial direction and alternately inclined to the radial direction; and wherein consecutive flanks in said radially jagged cross-sectional profile merge into each other by forming corners, respectively, with pairs of consecutive flanks including an angle within a range of 80° to 100° at a corner; and wherein the flanks are alternately inclined to the radial direction by positive and negative angles having an absolute value within a range of 60° to 120°;

wherein the structure borne sound attenuated comprises vibrations within acoustically relevant frequencies in the range of 10 to 20,000 Hz; and wherein the damping of such structure borne sound is by internal reflections of sound waves at a change of mechanical impedance at a boundary between the layers of materials, the jagged profile, and the corners.

11. The device of claim 10, wherein the flanks differ in length from each other such that integer of half-integer multiple length ratios are excluded for all possible pairs of flanks.

12. The device of claim 10, wherein the flanks differ in length such that for all possible pairs of flanks the length ratios are defined by different prime numbers.

13. The device of claim 10, wherein the flange includes two outer layers made of fiber-reinforced plastic and an inner layer between the two outer layers and made of an elastomer, wherein the outer layers are isolated by the inner layer; and wherein the thickness of the layers of fiber-reinforced plastic changes in radial direction from flank to flank.

14. A system comprising:
at least one rotational component; and
a device for absorbing structure-borne sound including at least one torque transmitting flange having two or more layers of materials of different damping capacity and stiffness stacked on each other;

wherein at least a portion of the flange has a radially jagged cross-sectional profile including two or more flanks consecutively arranged in radial direction and alternately inclined to the radial direction;

wherein consecutive flanks merge into each other by forming a corner, respectively, with pairs of consecutive flanks including an angle within a range of 80° to 100° at a corner;

wherein the structure borne sound attenuated by the device comprises vibrations within acoustically relevant frequencies in the range of 10 to 20,000 Hz; and wherein the damping of such structure borne sound is by internal reflections of sound waves at a change of mechanical impedance at a boundary between the layers of materials, the jagged profile, and the corners;

wherein the flange of said device is connected to the rotational component by connecting means.

15. The system of claim 14, wherein the rotational component is selected from a group comprising couplings and torsional vibration dampers.

16. The system of claim 14, wherein the rotational component is a compensation coupling for compensating axial and angular displacements of the axes of rotation of two rotating parts.

17. The device of claim 1, wherein the maximum thickness of the inner layer is less than twice the maximum thickness of the outer layers.

18. The device of claim 1, wherein the device is radially and torsionally stiff and does not provide substantial compensation of radial, axial, or angular displacement.

* * * * *